United States Patent
Wu

(10) Patent No.: US 7,035,099 B2
(45) Date of Patent: Apr. 25, 2006

(54) MOUNTING APPARATUS FOR DATA STORAGE DEVICES

(75) Inventor: Pin-Shian Wu, Tu-chen (TW)

(73) Assignee: Hon Hai Precision Ind. Co., LTD

( * ) Notice: Subject to any disclaimer, the term of this patent is extended or adjusted under 35 U.S.C. 154(b) by 6 days.

(21) Appl. No.: 10/948,612

(22) Filed: Sep. 22, 2004

(65) Prior Publication Data

US 2005/0099767 A1    May 12, 2005

(30) Foreign Application Priority Data

Nov. 7, 2003    (TW) .............................. 92219764 U

(51) Int. Cl.
G06F 1/16    (2006.01)

(52) U.S. Cl. ................... 361/685; 361/725; 312/223.1; 312/333; 248/222.11; 248/225.11

(58) Field of Classification Search ................. 361/685
See application file for complete search history.

(56) References Cited

U.S. PATENT DOCUMENTS 6,667,880 B1 *  12/2003  Liu et al. .................... 361/685
6,813,148 B1 *  11/2004  Hsu et al. .................... 361/685

FOREIGN PATENT DOCUMENTS

TW    190919    9/1992
TW    224797    6/1994

* cited by examiner

Primary Examiner—Lynn Feild
Assistant Examiner—Anthony Q. Edwards
(74) Attorney, Agent, or Firm—Wei Te Chung

(57) ABSTRACT

A mounting apparatus includes a drive bracket (20), a first latch member (30) and a second latch member (40) to secure two different sizes of data storage devices (10, 10') therein. The first latch member is movably attached to a first side wall (211) of the bracket via a coil spring (50). The first latch member forms a first locating position and a second locating position thereof. The second latch member comprises a stop (44). When the second latch member is adjustably attached to the first latch member in either of the first locating position and the second locating position. The corresponding data storage device with studs (14 or 14') installed in one sidewall thereof is slidably installed in the bracket. The studs ride over the stop of the second latch member to secure the data storage devices in the bracket.

18 Claims, 9 Drawing Sheets

MOUNTING APPARATUS FOR DATA STORAGE DEVICES

BACKGROUND OF THE INVENTION

1. Field of the Invention

The present invention relates to mounting apparatuses, and particularly to a mounting apparatus which readily secures two different sizes of data storages devices therein and allows convenient removal of the data storage devices therefrom.

2. Description of the Related Art

Generally speaking, when a computer is assembled, a drive bracket is mounted in a computer enclosure, and then data storage devices are fixed to the drive bracket. The data storage devices comprise various combinations of hard disk drives (HDDs), floppy disk drives (FDDs), and compact disk-read only memory (CD-ROM) drives.

A conventional data storage device is generally attached to a drive bracket by bolts or rails. Examples are disclosed in Taiwan Patent Application Nos. 82202124, 81207129 and 82207667. Fixing a data storage device to a drive bracket with bolts is unduly laborious and time-consuming. Furthermore, the computer enclosure needs extra operating space for carrying out the fixing operation. Fixing a data storage device in a drive bracket with rails is more convenient than using the above-described bolts. However, certain bolts are still needed to fix the rails to the drive bracket. Additionally, mounting systems using rails require a clearance between the data storage device and the drive bracket. This may cause electromagnetic interference (EMI) problems, and may lead to accumulation of static charges on the computer enclosure. Furthermore, the rails are generally made of plastic. This not only restricts grounding connection options between the data storage device and the drive bracket, but also tends to lead to extra maintenance, because the plastic rails are easily wearing out and needing replacement.

Thus an improved mounting apparatus which overcomes the above-mentioned problems is desired.

SUMMARY OF THE INVENTION

Accordingly, an object of the present invention is to provide a mounting apparatus which readily secures two different sizes of data storages devices therein and allows convenient removal of the data storage devices therefrom.

To achieve the above-mentioned object, a mounting apparatus includes a drive bracket, a first latch member and a second latch member to secure two different sizes of data storage devices therein. The first latch member is movably attached to a first side wall of the bracket via a coil spring. The first latch member forms a first locating position and a second locating position thereof. The second latch member comprises a stop. When the second latch member is adjustably attached to the first latch member in either of the first locating position and the second locating position. The corresponding data storage device with studs installed in one sidewall thereof is slidably installed in the bracket. The studs ride over the stop of the second latch member to secure the data storage devices in the bracket.

Other objects, advantages and novel features of the present invention will be drawn from the following detailed description of a preferred embodiment of the present invention with attached drawings, in which:

DETAILED DESCRIPTION OF THE INVENTION

Figure 1:
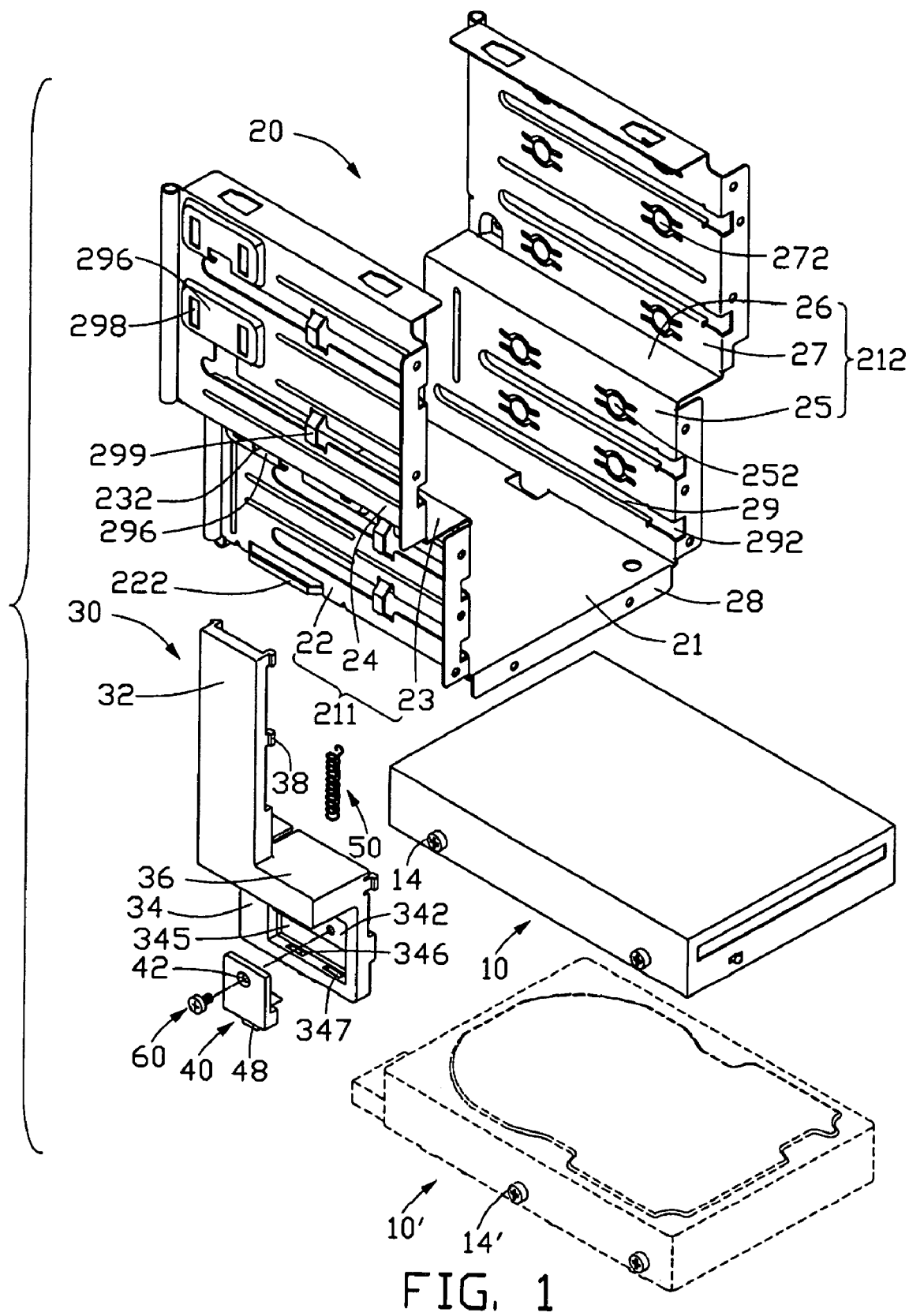
FIG. 1 is an exploded, isometric view of a drive bracket with a first latch member, a second latch member and a coil spring in accordance with the preferred embodiment of present invention, together with two different sizes of data storage devices.
Figure 2:
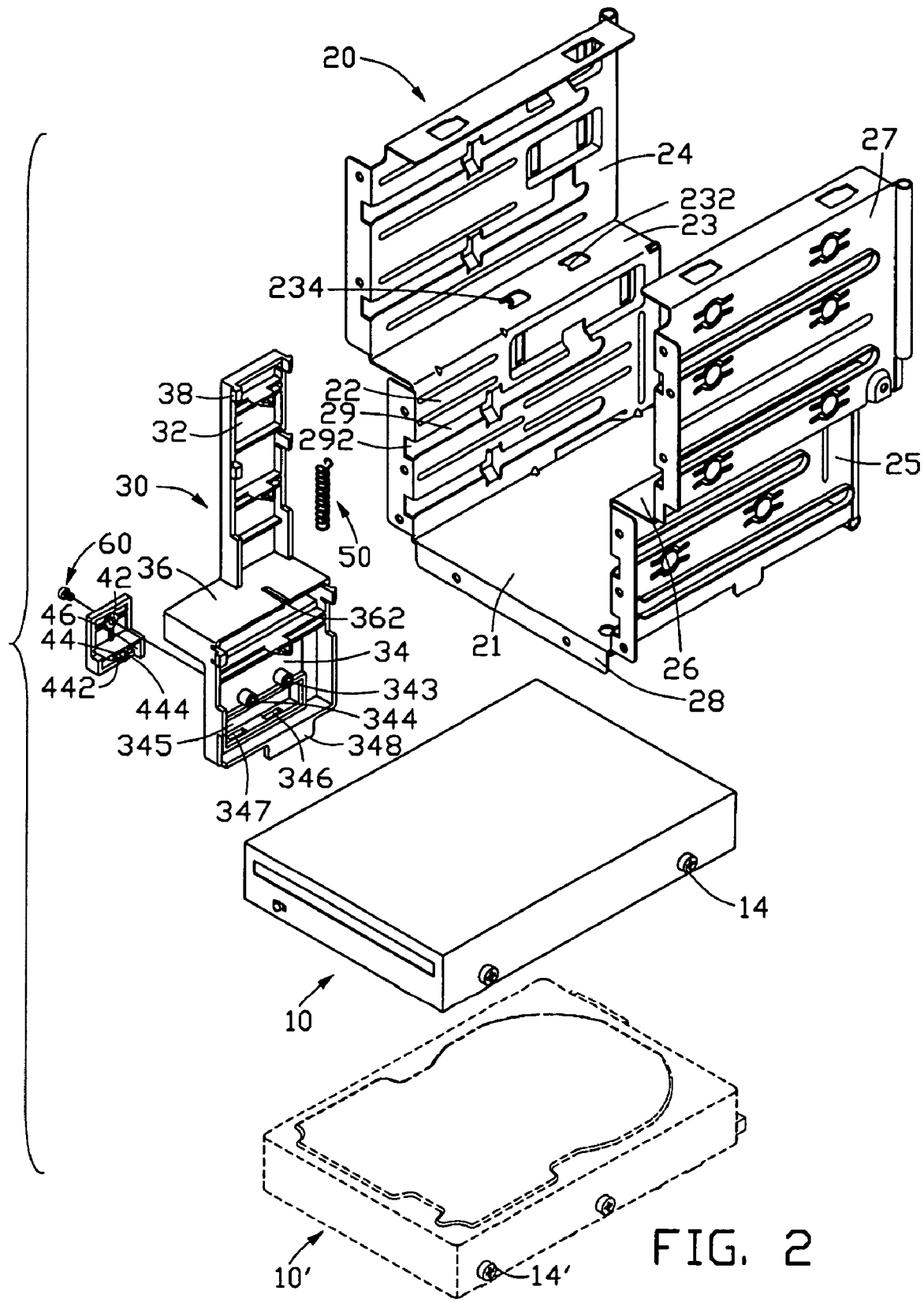
FIG. 2 is similar to FIG. 1, but viewed from another aspect.

Referring to FIGS. 1 and 2, a mounting apparatus in accordance with the preferred embodiment of the present invention is used to accommodate two different sizes of data storage devices 10, 10' therein. The mounting apparatus comprises a bracket 20, a first latch member 30 movably attached to the bracket 20 via a coil spring 50, and a second latch member 40 adjustably attached to the first latch member 30. The second latch member 40 is used to secure the data storage devices 10, 10' severally in two different locating positions of the drive bracket 20. The drive bracket 20 is installed in a computer cage (not shown).

The data storage devices 10, 10' each defines at least one pair of screw holes (not visual) in a sidewall thereof respectively, for engagingly receiving studs 14 or 14' therein.

The bracket 20 comprises a bottom wall 21, a first side wall 211 and a second side wall 212 extending perpendicular from two opposite sides of the bottom wall 21. The first side wall 211 comprises a first vertical wall 22, a first connecting wall 23 and a second vertical wall 24. The second side wall 212 comprises a third vertical wall 25, a second connecting wall 26 and a fourth vertical wall 27. The first vertical wall 22, second vertical wall 24, third vertical wall 25 and fourth vertical wall 27 each bend perpendicular outwardly to form a flange 28. The flanges 28 define a plurality of fixing holes (not labeled), for securing the bracket 20 to the computer cage.

A plurality of pairs of guiding slots 29 are defined in the corresponding first vertical wall 22 and third vertical wall 25, second vertical wall 24 and fourth vertical wall 27, parallel to the bottom wall 21 of the bracket 20. A guiding opening 292 is defined in the flanges 28 communicating with the guiding slots 29. A fixing portion 296 is formed on the first vertical 22 and the second vertical 24 at the end of each of the guiding slots 29. Each fixing portion 296 defines two apertures 298 therein. A connecting means 299 is across each of the guiding slots 29, for strengthening the structure.

An orienting portion 222 is formed outwardly at a bottom of the first vertical wall 22. A plurality of elastic tabs 252, 272 is formed on the third vertical wall 25 and fourth vertical wall 27. The first connecting wall 23 forms a limiting member 232 downwardly thereon, and a pothook 234 upwardly thereon for hitching the coil spring 50.

The first latch member 30 comprises a generally rectangular first main body 32, a second main body 34 and a connecting body 36 for perpendicularly connecting the first main body 32 and the second main body 34. A plurality of resilient hooks 38 is formed on both sides of the first main body 32 and the second main body 34, for moving slidably in the corresponding apertures 298 of the first vertical wall 22 and the second vertical wall 24 of the bracket 20. A recess 342 is defined in the second main body 34. Two threaded holes 343, 344 are defined in a top of the recess 342 (see FIG. 2) and a through hole 345 is defined in a bottom of the recess 342. Two orienting holes 346, 347 are defined in the first latch member 30 at the bottom of the recess 342, corresponding to the threaded holes 343, 344. The second main body 34 forms a fixing block 348 downwardly from a bottom, corresponding to the orienting portion 222 of the first vertical wall 22 of the bracket 20. The connecting body 36 defines a groove 362 therein corresponding to the limiting member 232 of the first horizontal wall 23 of the bracket 20. When the first latch member 30 moves relative to the bracket 20, the limiting member 232 moves in the groove 362, avoiding the first latch member 30 generates an excursion relative to the bracket 20.

The second latch member 40 configured to be fittingly received in the recess 342 of the first latch member 30. A mounting hole 42 is defined in the second latch member 40, corresponding to the threaded holes 343, 344. The second latch member 40 is mounted in a first locating position and a second locating position in the recess 342 of the first latch member 30, by using a screw 60 inserted into the mounting hole 42 and engaging in the threaded holes 343, 344 respectively. An orienting block 48 protrudes downwardly from a bottom of the second latch member 40, corresponding to the orienting holes 346, 347. The second latch member 40 inwardly forms a stop 44 corresponding to one stud 14 or 14' of the data storage device 10 or 10'. The stop 44 comprises a slanting surface 442 at a bottom and a vertical surface 444 at a side near the end of the guiding slot 29. A blocking board 46 is formed in the second latch member 40 facing the vertical surface 444 of the stop 44. Wherein the stop 44 and the blocking board 46 extend through the through hole 345 of the first latch member 30 and locate in the guiding slot 29 of the first vertical wall 22 of the bracket 20.

Figure 3:
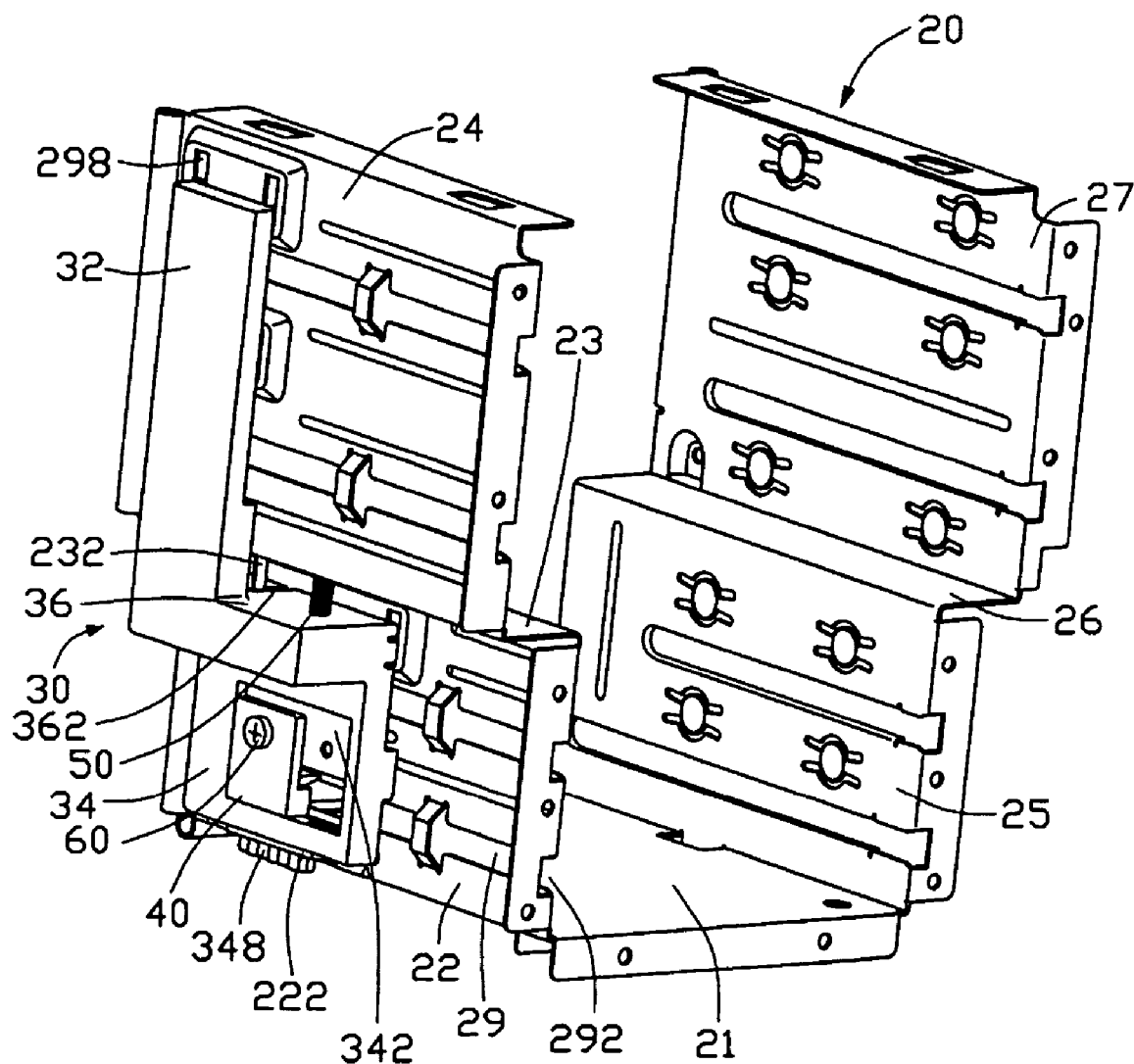
FIG. 3 is an assembled view of the bracket, the first latch member, the second latch member and the coil spring of FIG. 1, with the second latch member in a first locating position.
Figure 4:
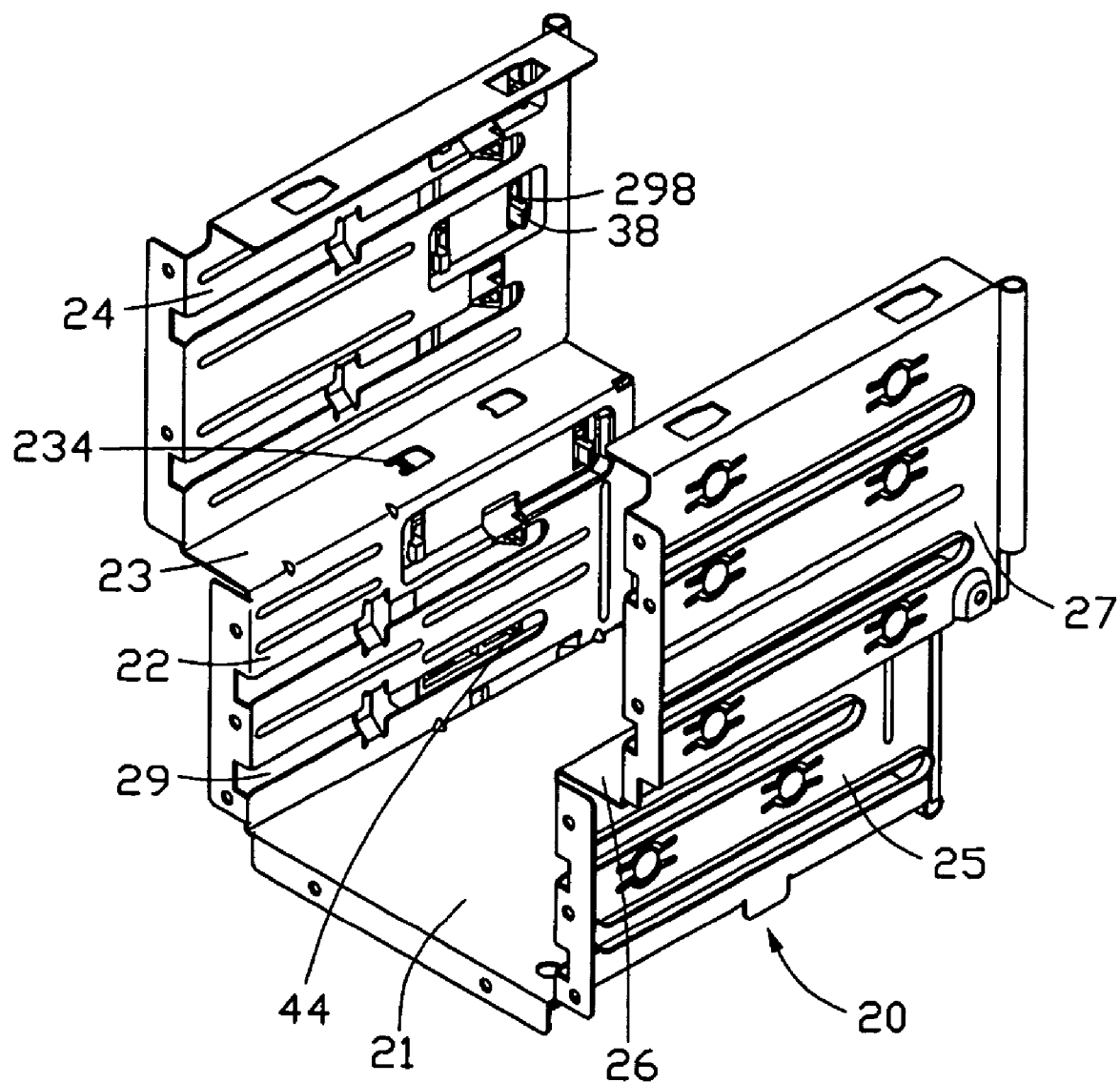
FIG. 4 is similar to FIG. 3, but viewed from another aspect.
Figure 5:
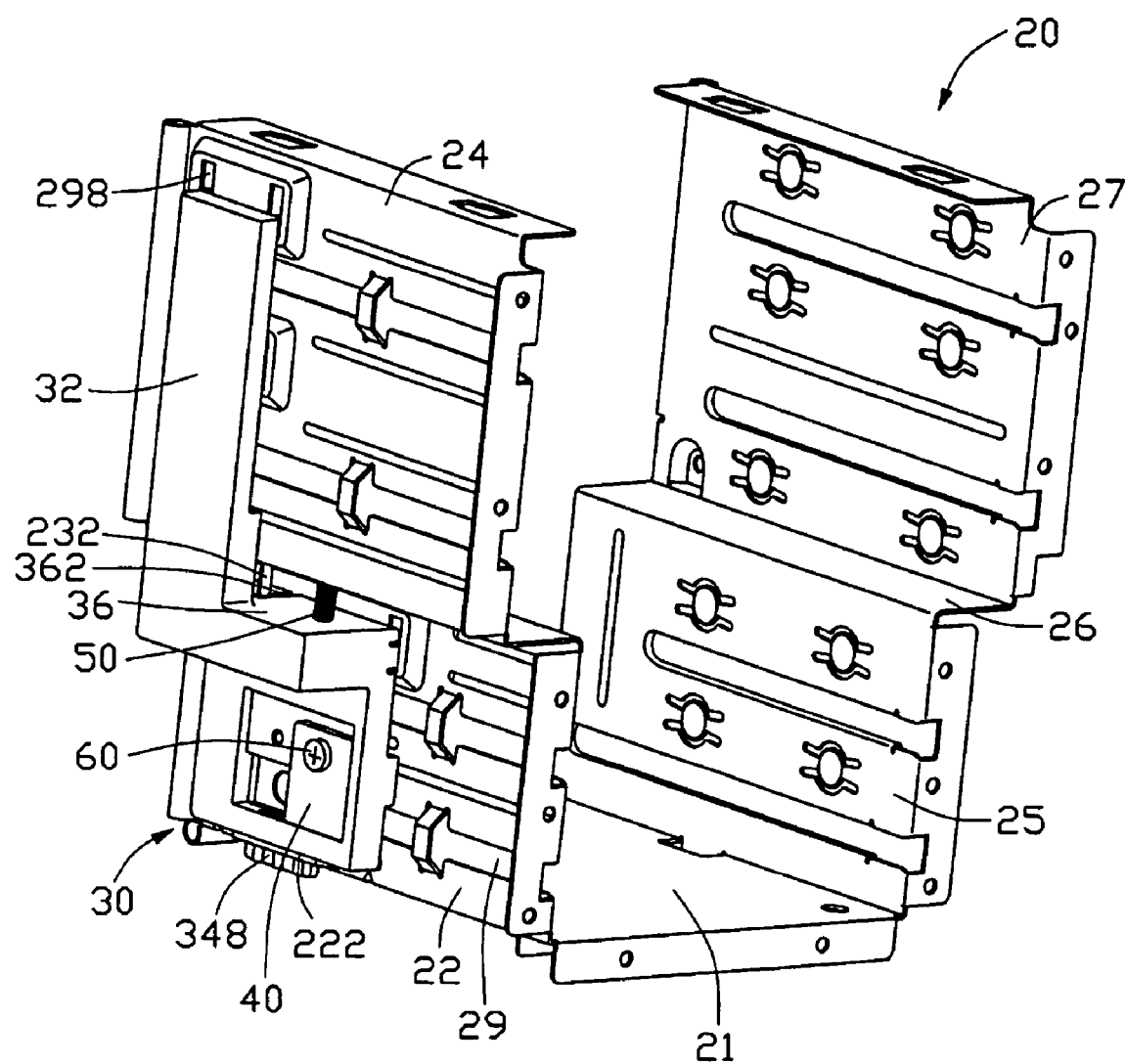
FIG. 5 is an assembled view of the bracket, the first latch member, the second latch member and the coil spring of FIG. 1, with the second latch member in a second locating position.

Referring to FIGS. 3–5, when assembling the first latch member 30 and the second latch member 40 to the bracket 20, one clasp (not labeled) of the coil spring 50 hitches the pothook 234 of the bracket 20 from a bottom of the first connecting wall 23 of the bracket 20. The fixing block 348 of the first latch member 30 is received in the orienting portion 222 of the bracket 20. The resilient hooks 38 engage in the corresponding apertures 298 of the bracket 20, with the other clasp (not labeled) of the coil spring 50 elastically depending on the connecting body 36 of the first latch member 30. Thus, the first latch member 30 is movably mounted on the first side wall 211 of the bracket 20. The orienting block 48 is inserted in the orienting hole 346 or 347. Then the second latch member 40 is mounted in the recess 342 of the first latch member 30 by inserting a screw 60 through the mounting hole 42 and engaging in the threaded hole 343 or 344. Thus, the second latch member 40 is mounted in the first locating position or the second locating position of the first latch member 30 respectively when the screw 60 engaging in the threaded hole 343 or 344.

Figure 6:
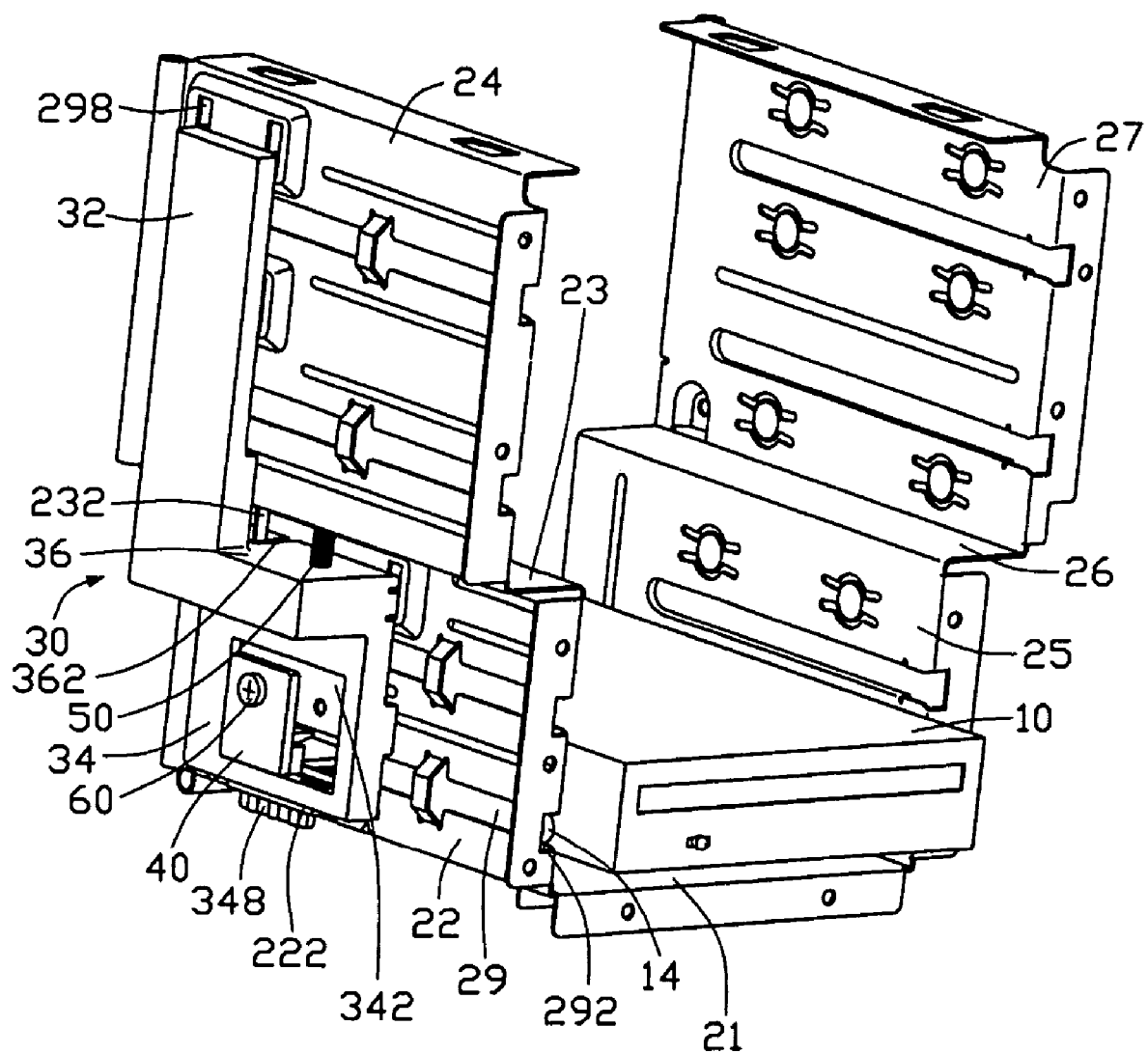
FIG. 6 is similar to FIG. 3, with one of the data storage devices mounted in the bracket.
Figure 7:
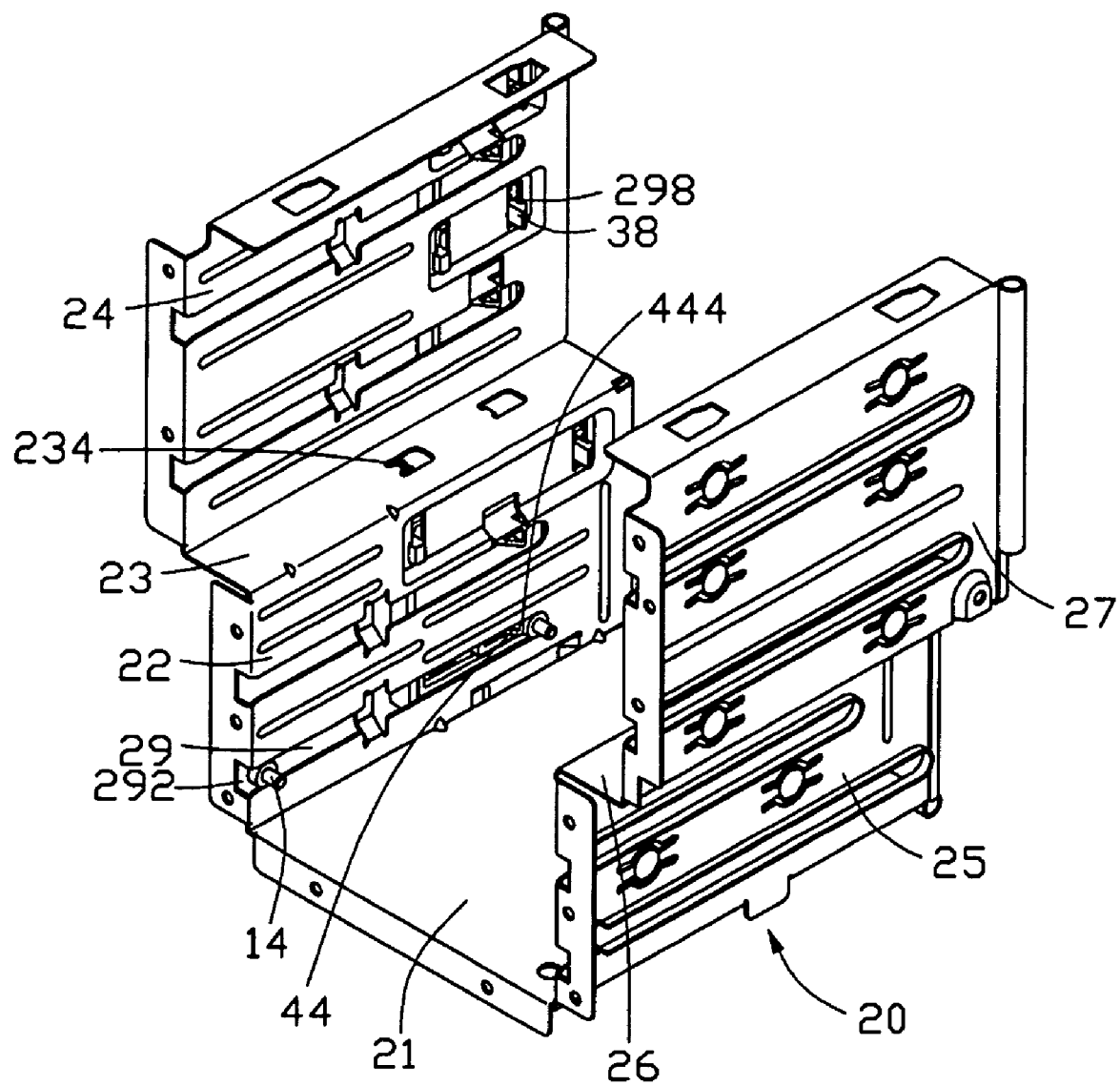
FIG. 7 is similar to FIG. 6 without the data storage device, but viewed from another aspect.

Referring also to FIGS. 6 and 7, when assembling the data storage device 10 to the bracket 20, convenient for description, the data storage device 10 is hidden and the studs 14 shown only in FIG. 7. The second latch member 40 is mounted in the first locating position. The data storage device 10 is pushed in the bracket 20 in a front-to-rear direction, with the studs 14 received in the guiding slots 29 from the guiding opening 292. Push the data storage device 10 along the guiding slots 29, and the corresponding stud 14 drives the first and second latch member 30, 40 to move in a vertical direction with deformation of the coil spring 50. The stud 14 moves along the slanting surface 442 of the stop 44. After the stud 14 rides over the corresponding stop 44, the coil spring 50 elastically rebounds. Then the stud 14 is located between the vertical surface 444 of the stop 44 and the block board 46. Thus the data storage device 10 is secured in the bracket 20.

Figure 8:
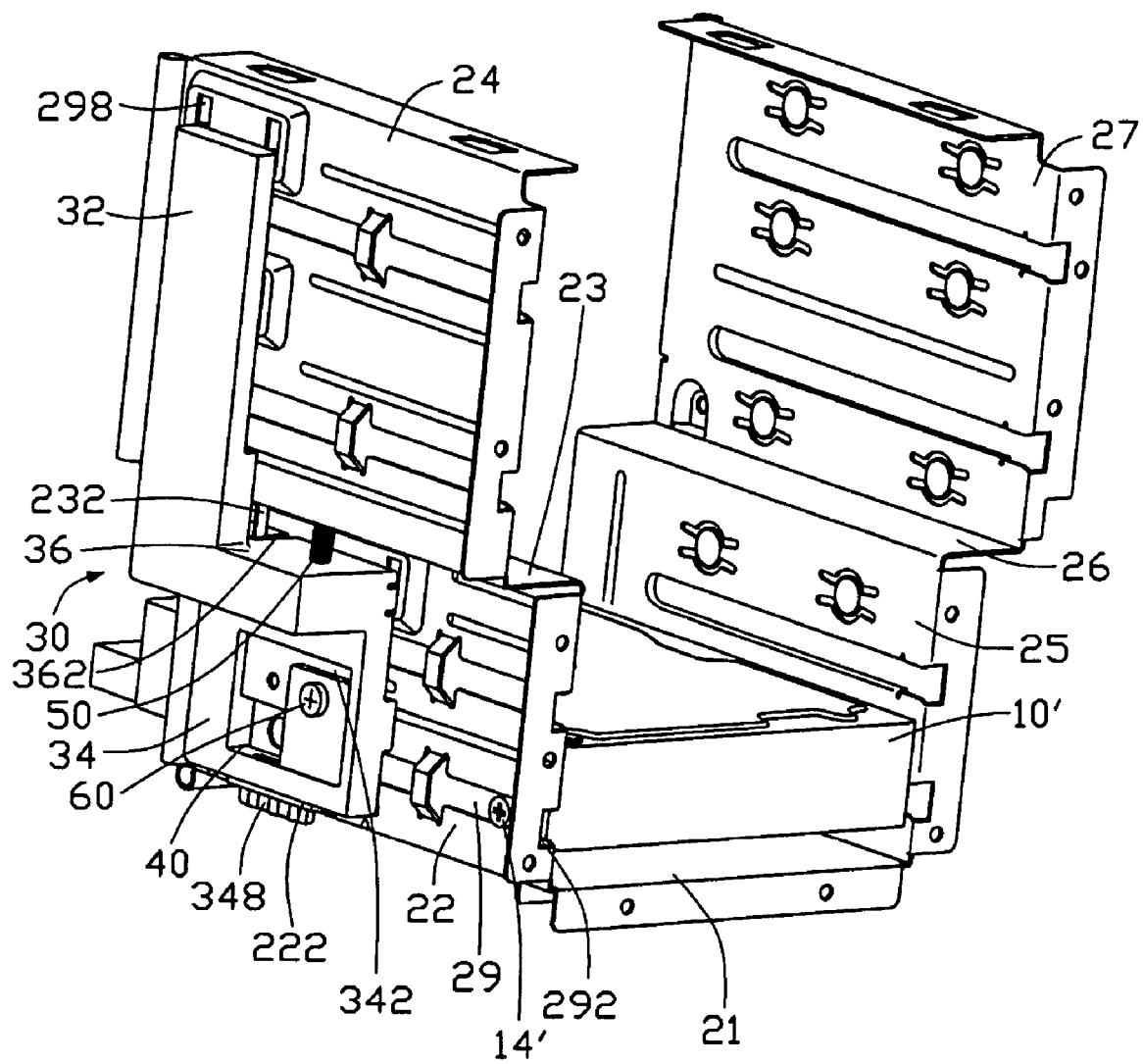
FIG. 8 is similar to FIG. 5, with the other of the data storage devices mounted in the bracket.
Figure 9:
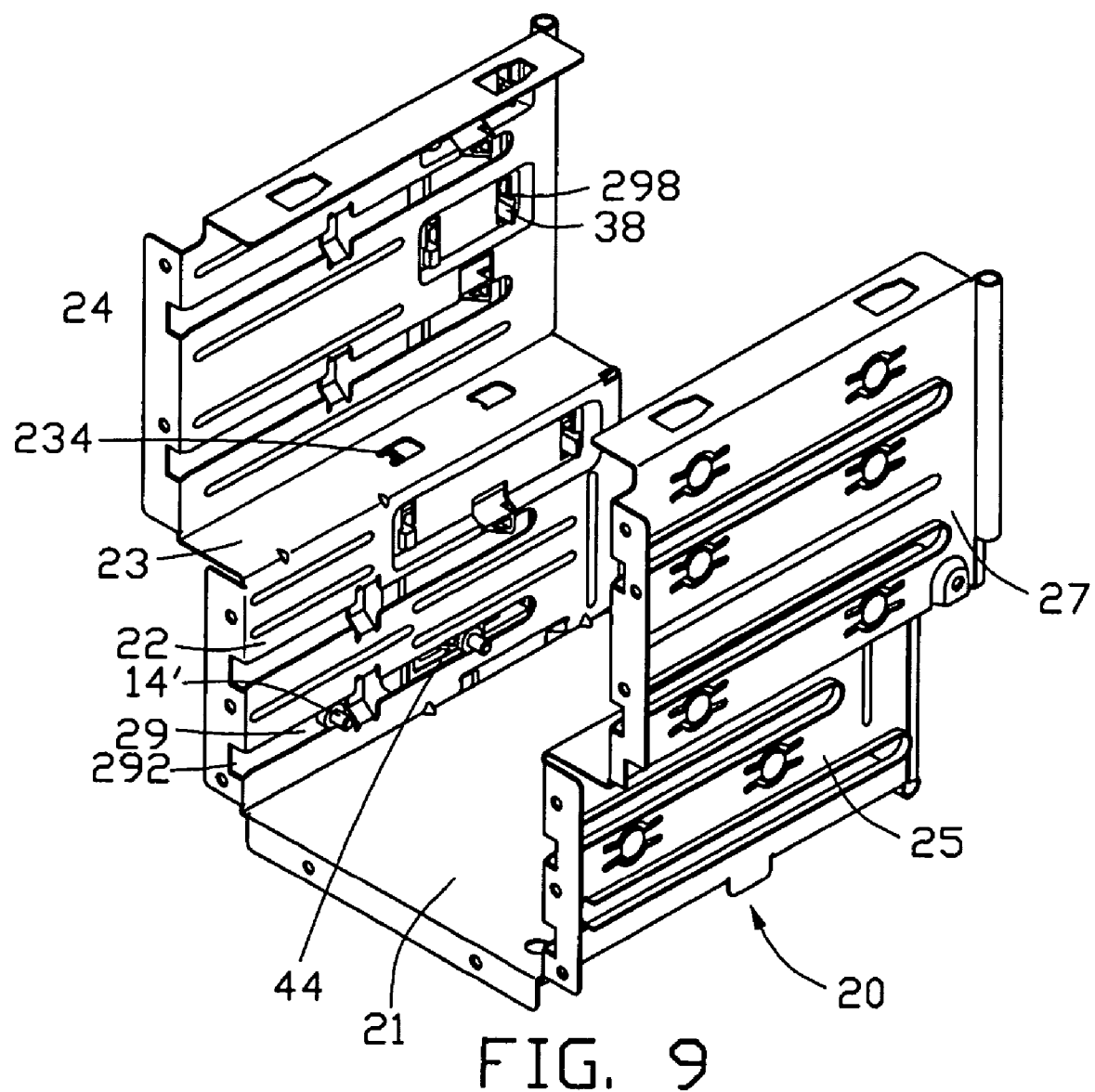
FIG. 9 is similar to FIG. 8, without the data storage device, but viewed from another aspect.

Referring also to FIGS. 8 and 9, when assembling the data storage device 10' to the bracket 20, convenient for description, the data storage device 10' is hidden and the studs 14' shown only in FIG. 9. The second latch member 40 is mounted in the second locating position. The data storage device 10' is pushed in the bracket 20 in a front-to-rear direction, with the studs 14' received in the guiding slots 29 from the guiding opening 292. Push the data storage device 10' along the guiding slots 29, and the corresponding stud 14' drives the first and second latch member 30, 40 to move in a vertical direction with deformation of the coil spring 50. The stud 14' moves along the slanting surface 442 of the stop 44. After the stud 14' rides over the corresponding stop 44, the coil spring 50 elastically rebounds. Then the stud 14' is located between the vertical surface 444 of the stop 44 and the block board 46. Thus the data storage device 10' is secured in the bracket 20.

In disassembling the data storage device 10 or 10', the first latch member 30 is pushed upwardly. The stop 44 of the second latch member 40 is lifted release the stud 14 or 14'. The data storage device 10 or 10' can be drawn from the bracket 20.

In a second embodiment, the apertures 298 are defined in the first latch member 30, and the corresponding resilient hooks 38 are formed on the first side wall 211 of bracket 20. The slanting surface 442 of the stop 44 is formed at a top. The coil spring 50 is stretched between the first connecting wall 23 of the bracket and the connecting body 36 of the first latch member 30.

It is to be understood, however, that even though numerous characteristics and advantages of the present invention have been set fourth in the foregoing description, together with details of the structure and function of the invention, the disclosure is illustrative only, and changes may be made in detail, especially in matters of shape, size, and arrangement of parts within the principles of the invention to full extent indicated by the broad general meaning of the terms in which the appended claims are expressed.

What is claimed is:

1. A mounting apparatus for accommodating two different sizes of data storage devices with a stud fixed in a sidewall thereof respectively, the mounting apparatus comprising:
   a bracket comprising a first side wall, a guiding slot for the studs of the data storage devices defined in the first side wall;
   a first latch member vertically movably attached to the first side wall via a resilient member; and a second latch member adapted to be attached to different positions of the first latch member for securing the different sizes of data storage devices, the second latch member comprising a stop corresponding to the guiding slot of the bracket, whereby said stud drives the stop thereby forcing the first and second latch member to move in a vertical direction, after said stud rides over the stop, the resilient member elastically rebounds thereby forcing the first and second latch member to move back, said stud is blocked by the stop, the data storage device is thereby secured in the bracket.

2. The mounting apparatus as described in claim 1, wherein the first side wall of the bracket comprises a first vertical wall, a first connecting wall and a second vertical wall.

3. The mounting apparatus as described in claim 1, wherein the bracket further comprises a second side wall defining a guiding slot corresponding to the guiding slot of the first side wall, the second side wall of the bracket comprises a third vertical wall, a second connecting wall and a fourth vertical wall.

4. The mounting apparatus as described in claim 2, wherein the first fixing means comprise a plurality of apertures defined in the first vertical wall and the second vertical wall.

5. The mounting apparatus as described in claim 2, wherein the first latch member comprises a first main body, a connecting body and a second main body.

6. The mounting apparatus as described in claim 5, wherein the second fixing means comprise a plurality of resilient hooks formed on both sides of the first and second main bodies.

7. The mounting apparatus as described in claim 5, wherein a limiting member is formed downwardly from the first connecting wall of the bracket, a groove corresponding to the limiting member is defined on the first connecting body of the first latch member.

8. The mounting apparatus as described in claim 5, wherein an orienting portion is formed at a bottom of the first vertical wall of the bracket, a fixing block is formed at a bottom of the second main body of the first latch member.

9. The mounting apparatus as described in claim 5, wherein a recess is defined in the second main body of the first latch member, a through hole is defined therein in a bottom of the recess, two threaded holes are defined in a top of the recess corresponding to the first and second locating positions.

10. The mounting apparatus as described in claim 9, wherein a mounting hole is defined in the second latch member, corresponding to the threaded holes of the first latch member.

11. The mounting apparatus as described in claim 9, wherein the stop extends through the through hole and located in the guiding slot of the first side wall of the bracket.

12. The mounting apparatus as described in claim 11, wherein the stop comprises a slanting surface and a vertical surface.

13. The mounting apparatus as described in claim 12, wherein a block board is formed on the second latch member, facing to the vertical surface of the stop.

14. A mounting apparatus for accommodating a plurality of different sizes of data storage devices with a stud fixed in a sidewall thereof respectively, the mounting apparatus comprising:

a bracket comprising a first side wall, a guiding slot for the studs of the data storage devices defined in the first side wall;

a first latch member vertically movably attached to the first side wall via a resilient member; and a second latch member adapted to be attached to different positions of the first latch member for securing the different sizes data storage devices, the second latch member comprising a stop corresponding to the guiding slot of the bracket, the stop comprising a slanting surface, whereby said stud drives the stop thereby forcing the first and second latch member to move in a vertical direction, said stud moves along the slanting surface of the stop, after said stud rides over the stop, the resilient member elastically rebounds thereby forcing the first and second latch member to move back, said stud is blocked by the stop, the data storage device is thereby secured in the bracket.

15. The mounting apparatus as described in claim 14, wherein a recess is defined in the first latch member, a plurality of threaded holes is defined in the recess.

16. The mounting apparatus as described in claim 15, wherein a mounting hole is defined in the second latch member, corresponding to the threaded holes of the first latch member.

17. A mounting apparatus for accommodating a plurality of different sizes of data storage devices with a stud fixed in a sidewall thereof respectively, the mounting apparatus comprising:

a bracket comprising a first side wall and a second side wall under said first side wall in an offset relation and connected to said first side wall with a horizontal connection wall;

guiding slots for the studs of the data storage devices defined in the first side wall and the second side wall; and a latch member having a Z-like configuration to comply with said first side wall, said second side wall and the horizontal connection wall, and vertically movably attached to the bracket via a resilient member and between locking and unlocking positions; wherein the latch member comprises a plurality of stoppers for confronting the corresponding studs in a front-to-back direction for preventing removal of the data storage devices when said latch member is located in the locking position, while being offset from the corresponding studs in the front-to-back direction for allowing withdrawal of the data storage devices when said latch member is in the unlocking position.

18. The mounting apparatus as claimed in claim 17, wherein another latch member is attached to the latch member with a selective position for compliance with the data storage devices which are located beside the second side wall.

* * * * *